Dec. 23, 1958     C. DEGENHART     2,865,237
DEBURRING AND CHAMFERING HAND TOOL
Filed Aug. 24, 1956

*INVENTOR.*
CHARLES DEGENHART
BY

Knox & Knox

United States Patent Office 2,865,237
Patented Dec. 23, 1958

2,865,237

DEBURRING AND CHAMFERING HAND TOOL

Charles Degenhart, Silver City, N. Mex.

Application August 24, 1956, Serial No. 606,130

3 Claims. (Cl. 77—73)

The present invention relates generally to hand tools and more particularly to a deburring and chamfering tool adapted to be operated by hand and used for precision work.

It is a primary object of this invention to provide a deburring and chamfering tool which is specifically and perfectly adapted for deburring and chamfering the necks of cartridge cases. This precision deburring and chamfering of the necks of cartridge cases is required by bench rest shooters, hand loaders and reloaders and other enthusiasts who require near perfect construction of cartridges.

Another object of this invention is to provide a deburring tool which is safe as well as convenient to operate, the safety feature arising out of the fact that a pilot is inserted selectively into the ends of the hand tool and this pilot absolutely prevents the inadvertent slipping of the cartridge case away from the tool while the actual deburring and chamfering is in process, thus preventing gashing of the hands and fingers so frequently encountered in the use of such tools, especially when the outside burrs are being removed.

Another object of this invention, ancillary to the above recited primary object, is to provide special aligning and seating means in the body of the tool and the pilot so that these parts cooperate to assure axial alignment of the cartridge case neck with the axis of the deburring and chamfering blades, the tilting or twisting of the hand tool during operation thereof being positively prevented with the result that a completely uniform cut is made by the blades and the correct amount of metal is removed from the inside and outside of the neck of the cartridge case.

And a last object to be mentioned specifically is to provide a deburring and chamfering tool and pilot combination which is adapted for fabrication from different materials, so that the choice of material can be according to the dictates of availability and price considerations, the exact sizes and proportions being matters easily determined to suit particular conditions and needs, it being specifically pointed out that the instant invention is adaptable to be made with a considerable range of sizes of pilots for use with a single deburring and chamering tool, so that a very considerable range of sizes of cartridge cases can be processed by the present deburring and chamfering tool by the mere replacement of the pilot.

With these objects definitely in view, along with other objects which will appear as this description proceeds, this invention consists in the novel construction, combination and arrangement of elements and portions as will be hereinafter fully described in the specification, particularly pointed out in the appended claims, and illustrated in the accompanying drawing which forms a material part of the disclosure and in which:

Figure 1:
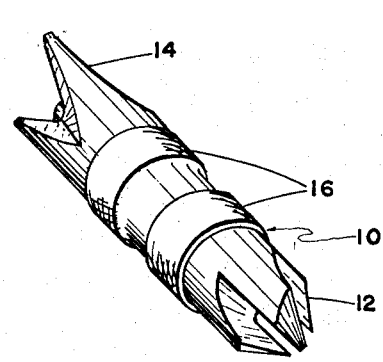
Figure 1 is an isometric view of the deburring and chamfering tool proper with the pilot removed therefrom.
Figure 2:
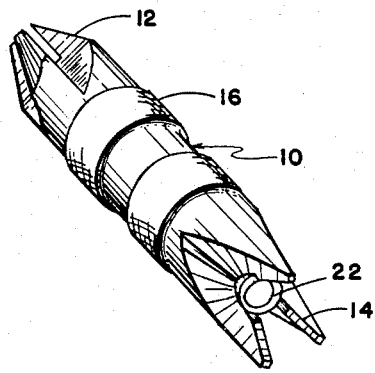
Figure 2 is a similar view, the deburring and chamfering tool being turned end for end to disclose a seat provided in the end having blades for external burring.
Figure 3:
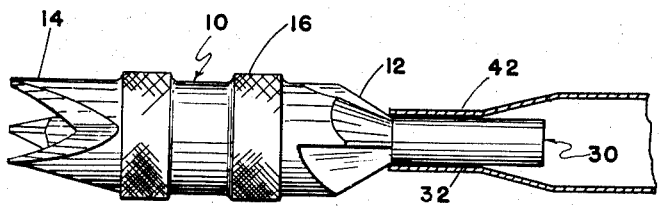
Figure 3 is an elevational view of the tool with the pilot operatively mounted in the end of the tool having the internal deburring blades, and a cartridge case is fragmentarily shown in vertical section in the position assumed thereby during the deburring and chamfering operation.
Figure 4:
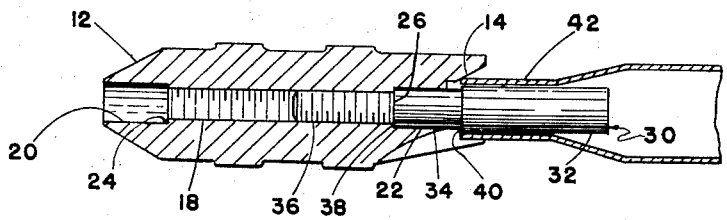
Figure 5:
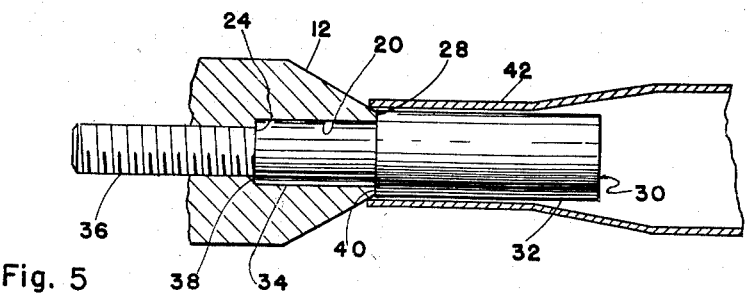

Figure 4 is a view, somewhat similar to Figure 3, but showing the deburring and chamfering tool proper in longitudinal vertical section and showing the tool as used in removing the external burrs from a cartridge case; and Figure 5 is an enlarged view of the pilot with fragmentary showings of the deburring and chamfering tool proper and the cartridge case in vertical section, this view being proposed as showing in greater detail the exact and critical proportioning of the pilot and the end of the tool having the blades used for internal deburring and chamfering.

Similar characters of reference indicate similar elements or portions throughout the specification and throughout the different views in the drawing.

Referring now to the drawing in detail, this apparatus includes a deburring and chamfering tool having a body 10 of generally cylindrical form and having internal deburring and chamfering blades 12 at one end and external deburring blades 14 at the other end, these blades being integral or unitary with the body of the tool. The body portion may be provided with knurled portions 16 and the body portion of the hand tool may be substantially conventional, except that it is provided with an axial bore 18 which is threaded. Actually, the body portion need have such a bore only near the end portions thereof, although, as a matter of expediency, this bore will probably always be formed throughout the entire length of the tool.

The tool is provided with plain bore portions at each end of the threaded or central portion thereof, the plain bore portion 20 being disposed centrally within the general confines of the inside deburring or chamfering blades 12 and the plain bore portion 22 being disposed centrally within the general confines of the external burring blades. A stop face 24 or 26 is provided at each end of the threaded portion of the axial bore 18, the stop face 24 being that disposed adjacent the internal deburring blades. A blunt end 28 is defined by the terminals of the inside deburring and chamfering blades.

Coming now to a description of a pilot, this pilot will be noted as a necessary part of the instant tool, the pilot being generally indicated by the numeral 30. This pilot comprises a plug 32 of cylindrical form, the diameter of the plug 32 being determined completely by the internal diameter of the neck of the cartridge to be processed by the tool. In other words, the pilots are made in sets to accompany a single deburring and chamfering tool proper or, otherwise stated, a plurality of pilots will accompany each body 10, so that the user can employ the same body 10 for processing a variety of sizes of cartridge cases.

The pilot further comprises an intermediate portion 34 which is of plain cylindrical form and of a diameter considerably smaller than the plug 32, and a threaded shank 36. A shoulder 38 is thus defined between the threaded shank 36 and the intermediate portion 34 while a second shoulder 40 is defined between the intermediate portion 34 and the plug 32.

The pilot 30 is selectively inserted into the ends of the body 10, the threaded shank 36 engaging the threaded bore and the shoulder 38 engaging the shoulder 24 and the shoulder 26, as the case may be. In this regard, it should be carefully noted that in the end of the tool having the internal deburring and chamfering blades 12, these last mentioned blades are of such dimension that the blunt end 28 is spaced from the seat 24 a distance exactly equal to the spacing of the shoulder 38 from the shoulder 40. The result of this critical proportioning is that the shoulder 40 rests upon and partially, at least, covers the said blunt end while the shoulder 38 simultaneously engages the seat 24. This prevents damage to the ends of the blades 12 in two ways, first by preventing the pilot from itself damaging the blades by being screwed down too tightly thereon, and secondly by assuring the positioning of the cartridge case neck 42 slightly beyond the extreme tip of the tool blades when the internal burrs are being removed from said neck 42. Considerably greater accuracy has been obtained by this arrangement of elements, partly due to the fact that the true dimensioning of the blades at a slight distance from the tips thereof is easier to accomplish, which results in a precision chamfer on the inside of the cartridge case. A similar coaction of elements will be observed at the end of the tool with the external deburring blades 14, these blades being relieved near the center of the tool and adjacent the plain bore portion 22, and the shoulder 38 abutting the seat 26 to limit the entry of the pilot 30 into this end of the tool. A certain clearance is thus provided and the blades are more easily maintained in good condition. In this connection, it should be particularly noted that the plain cylindrical portions identified as the intermediate portion 34 of each pilot will be accurately finish machined to fit snugly within the plain bore portions 20 and 22, to constitute pilot stabilizing means and giving firmness and accuracy of positioning to the pilot 30. The threads of the threaded shank 36 and the bore 18 can be chased to make the pilots easily insertable by hand, since accuracy of positioning of the pilots is determined and assured by the provision of these intermediate portions 34 of plain cylindrical form fitting snugly within the plain bore portions 20 and 22, with the result that the tool is convenient to work with as well as being completely accurate in the deburring and chamfering process.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. A precision deburring and chamfering hand tool comprising: an elongated body having internal deburring and chamfering blades at one end and external deburring and chamfering blades at the other end; said body having a threaded bore disposed axially thereof and having its ends adjacent said ends of the body; and a pilot comprising a cylindrical plug adapted to fit into the neck of a cartridge case and further comprising a threaded pin selectively engageable in said ends of the bore.

2. A precision deburring and chamfering hand tool comprising: an elongated body having internal deburring and chamfering blades at one end and external deburring and chamfering blades at the other end; said body having a threaded bore disposed axially thereof and having its ends adjacent said ends of the body; and a pilot comprising a cylindrical plug adapted to fit into the neck of a cartridge case and further comprising a threaded pin selectively engageable in said ends of the bore; said body having plain bore portions disposed on said axis and within the general outline of the blades and extending from the ends of the bore to the ends of the body; and said pilot having a plain cylindrical intermediate portion dimensioned to fit selectively and snugly in said plain bore portions; said pilot having a shoulder thereon between said threaded pin and said intermediate portion; said body having stop faces between said threaded bore and the plain bore portions for abutting engagement with said shoulder.

3. A tool according to claim 2 wherein said intermediate portion and the plain bore portion adjacent to said internal deburring and chamfering blades are equal in length; said plug of the pilot being slightly greater in diameter than said intermediate portion so that a second shoulder is defined therebetween; said second shoulder abutting the ends of said internal deburring and chamfering blades and extending slightly radially outwardly from the end thereof when the pilot is secured in said one end of said body.

References Cited in the file of this patent

UNITED STATES PATENTS

| | | |
|---|---|---|
| 1,649,899 | Hellyer | Nov. 22, 1927 |
| 1,927,463 | McIntosh | Sept. 19, 1933 |
| 2,242,821 | Fanslow | May 20, 1941 |
| 2,359,931 | Moffitt | Oct. 10, 1944 |
| 2,374,552 | Marini | Apr. 24, 1945 |
| 2,453,848 | Livingston et al. | Nov. 16, 1948 |